(12) United States Patent
Maciulewicz et al.

(10) Patent No.: US 11,845,087 B2
(45) Date of Patent: Dec. 19, 2023

(54) HYDROSEEDERS HAVING INTEGRATED BALE GRINDERS AND METHODS

(71) Applicant: DHG, Inc., Fairfield, OH (US)

(72) Inventors: Gordon Maciulewicz, Monroe, OH (US); Aaron Andrew Kime, Liberty Township, OH (US)

(73) Assignee: DHG, INC., Fairfield, OH (US)

( * ) Notice: Subject to any disclaimer, the term of this patent is extended or adjusted under 35 U.S.C. 154(b) by 245 days.

(21) Appl. No.: 17/200,139

(22) Filed: Mar. 12, 2021

(65) Prior Publication Data

US 2021/0197204 A1    Jul. 1, 2021

Related U.S. Application Data

(62) Division of application No. 16/034,765, filed on Jul. 13, 2018, now Pat. No. 10,974,253.

(51) Int. Cl.
| | |
|---|---|
| B02C 21/02 | (2006.01) |
| B02C 18/14 | (2006.01) |
| B02C 18/22 | (2006.01) |
| A01C 7/00 | (2006.01) |
| A01C 7/06 | (2006.01) |
| A01C 23/00 | (2006.01) |
| B02C 23/20 | (2006.01) |

(Continued)

(52) U.S. Cl.
CPC .............. *B02C 21/02* (2013.01); *A01C 7/004* (2013.01); *A01C 7/06* (2013.01); *A01C 23/008* (2013.01); *A01F 29/00* (2013.01); *B02C 18/145* (2013.01); *B02C 18/2291* (2013.01); *B02C 23/20* (2013.01); *A01C 23/047* (2013.01)

(58) Field of Classification Search
CPC ... B02C 21/02; B02C 18/145; B02C 18/2291; B02C 23/20; A01C 23/008; A01C 23/047; A01C 7/06
See application file for complete search history.

(56) References Cited

U.S. PATENT DOCUMENTS 4,506,990 A * 3/1985 Neier ................... B01F 33/502
366/322
4,597,672 A * 7/1986 Neier ................... B01F 27/726
198/662

(Continued)

FOREIGN PATENT DOCUMENTS

| CN | 205510786 U | 8/2016 |
| CN | 206100881 U | 4/2017 |
| CN | 107223390 A | 10/2017 |

OTHER PUBLICATIONS

Emerald Seed & Supply, Bowie, Kincaid and turbo turf Hydroseeders and Hydroseeding, online catalog, 2010, 4 pages.

*Primary Examiner* — Faye Francis
(74) *Attorney, Agent, or Firm* — Dinsmore & Shohl LLP

(57) ABSTRACT

In one embodiment, a hydroseeder has an integrated bale grinder. The hydroseeder includes a tank, an agitator, a plurality of grinding flights, and a basket. The tank includes an opening and is configured to hold a material slurry. The agitator is positioned below the opening and is configured to agitate the material slurry. The plurality of grinding flights extends from the agitator and is configured to grind a material bale as it is introduced into the tank. The basket extends from the opening of the tank and is configured to direct the material bale toward the plurality of grinding flights.

6 Claims, 10 Drawing Sheets

(51) Int. Cl.
*A01F 29/00* (2006.01)
*A01C 23/04* (2006.01)

(56) References Cited

U.S. PATENT DOCUMENTS

| | | | |
|---|---|---|---|
| 5,395,058 | A | 3/1995 | Doyle |
| 5,597,125 | A | 1/1997 | Bouldin |
| 5,622,323 | A * | 4/1997 | Krueger .............. B01F 33/5023 241/101.76 |
| 5,868,327 | A | 2/1999 | Dawson |
| 6,547,173 | B1 | 4/2003 | von Rotenhan |
| 6,827,304 | B2 | 12/2004 | Rousseau |
| 7,028,932 | B2 | 4/2006 | Lucas |
| 7,028,933 | B2 * | 4/2006 | Maiz .................... B01F 33/833 241/101.8 |
| 7,871,029 | B2 * | 1/2011 | Frey .................... A01F 29/005 241/247 |
| 8,177,419 | B2 | 5/2012 | Neier et al. |
| 8,740,117 | B1 * | 6/2014 | Zimmerman .......... A01K 31/04 241/185.5 |
| 9,832,923 | B2 | 12/2017 | Thomas |
| 10,687,452 | B2 | 6/2020 | Lopez |

* cited by examiner

HYDROSEEDERS HAVING INTEGRATED BALE GRINDERS AND METHODS

CROSS-REFERENCE TO RELATED APPLICATIONS

The present application is a divisional of U.S. Pat. No. 10,974,253, filed Jul. 13, 2018, the entirety of which is herein incorporated by reference.

TECHNICAL FIELD

The present specification generally relates to hydroseeders and, more specifically, hydroseeders with integrated bale grinders.

BACKGROUND

Hydroseeding (or hydraulic mulch seeding, hydro-mulching, hydraseeding) is a planting process that generally uses a material slurry of water, seed, hydro-mulch, and fertilizer. The material slurry is produced within a mixing tank by mixing the various ingredients with an agitator. The material slurry is then drawn out by a material pump and spraying unit for application to prepared ground. The seed, hydro-mulch, and fertilizer may be provided in pressed/dry 50 lb. material bales. Most current systems require a user to lift and drop the full 50 lb. bale into the mixing tank where it is soaked by the water and gets broken up by the agitator. Such processes may leave large clumps of the material bale still intact, which may clog the material pump or spraying unit.

Accordingly, a need exists for alternative hydroseeders with integrated bale grinders for breaking up material bales.

SUMMARY

In one embodiment, a hydroseeder has an integrated bale grinder. The hydroseeder includes a tank, an agitator, a plurality of grinding flights, and a basket. The tank includes an opening and is configured to hold a material slurry. The agitator is positioned below the opening and is configured to agitate the material slurry. The plurality of grinding flights extends from the agitator and is configured to grind a material bale as it is introduced into the tank. The basket extends from the opening of the tank and is configured to direct the material bale toward the plurality of grinding flights.

In another embodiment, a hydroseeder has an integrated bale grinder. The hydroseeder includes a tank and an agitator. The tank includes an opening and is configured to hold a material slurry. The agitator is positioned below the opening and is configured to agitate the material slurry. The agitator includes a rotatable shaft, a plurality of mixing paddles, and a plurality of grinding flights. The plurality of mixing paddles extends from the rotatable shaft along a first segment. The plurality of grinding flights extends from the rotatable shaft along a second segment and is configured to grind a material bale as it is introduced into the tank.

In yet another embodiment, a method of preparing a material slurry for a hydroseeding operation includes providing a hydroseeder. The hydroseeder includes a tank, an agitator, a plurality of grinding flights, and a basket. The tank includes an opening and is configured to hold the material slurry. The agitator is positioned below the opening. The plurality of grinding flights extends from the agitator. The basket extends from the opening of the tank. The method further includes adding a liquid to the tank of the hydroseeder, directing a material bale through the opening of the tank, wherein the basket directs the material bale toward the plurality of grinding flights, grinding the material bale with the plurality of grinding flights, wherein in particles of the material bale are directed around the plurality of grinding flights and into the liquid, and agitating the liquid and the particles of the material bale with the agitator to form the material slurry.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to hydroseeders and methods of preparing a material slurry for a hydroseeding operation. In particular, hydroseeders as will be described herein include an integrated bale grinder. The bale grinder may be incorporated into an agitator of the hydroseeder and configured to grind up material bales as they are introduced into a tank of the hydroseeder. This allows for the bales to be more finely integrated into the material slurry produced within the tank of the hydroseeder. By finely grinding material bales, clogs in a material sprayer/pump of the hydroseeder during application seeding/mulching processes may be prevented. These and other features will be described in greater detail below.

Figure 1:
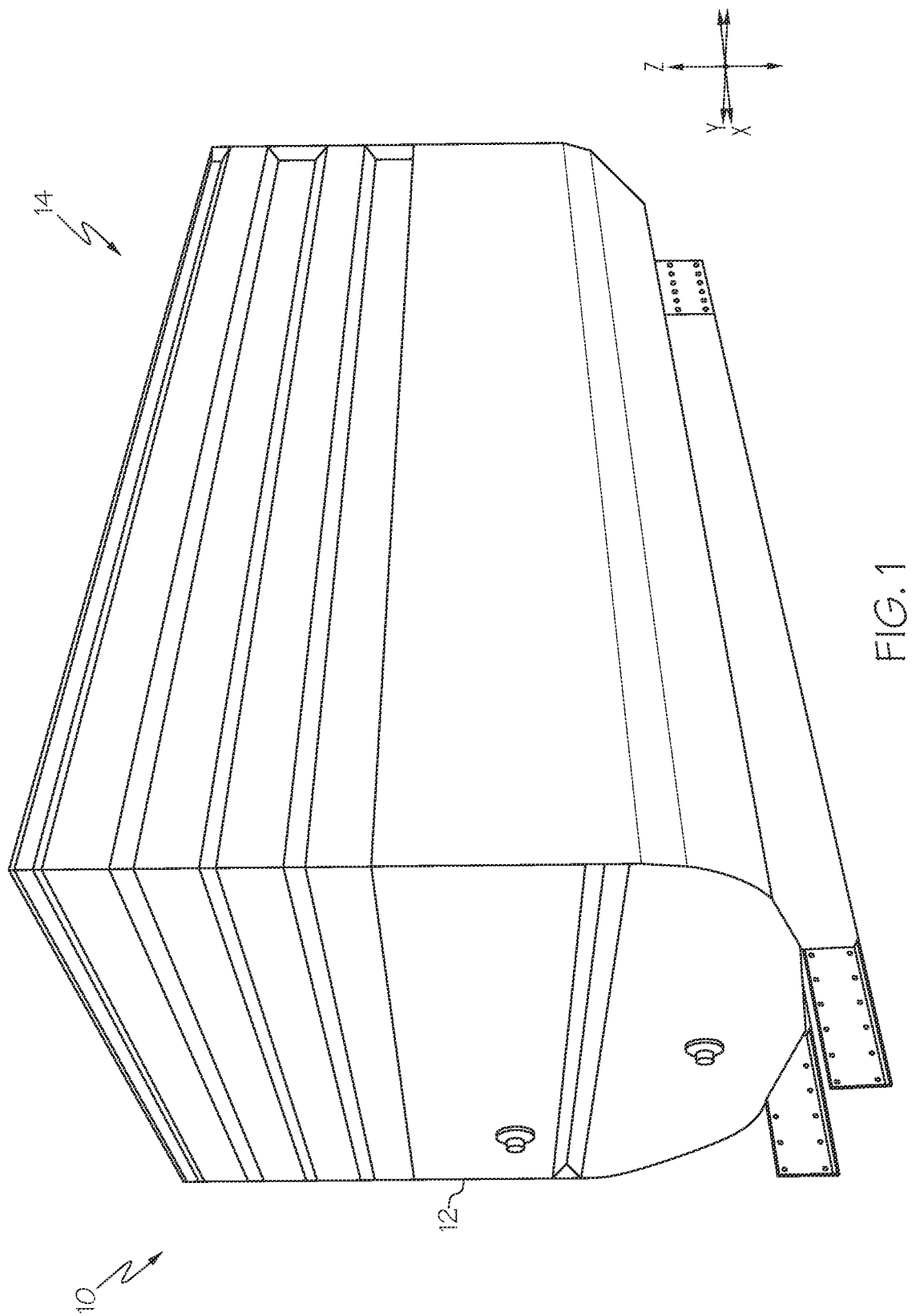
FIG. 1 depicts a perspective view of a hydroseeder, according to one or more embodiments shown and described herein.

Referring now to FIG. 1, a hydroseeder 10 is generally depicted. Though not shown, the hydroseeder 10 may be positioned or integrated into a vehicle or trailer to aid in transporting the hydroseeder 10 to a location for performing a hydroseeding operation. As noted above, hydroseeding is a planting process that uses a material slurry of seed, mulch, fertilizer, and liquid (e.g., water) that is sprayed onto prepared earth. However, hydroseeders may be useful in applications beyond hydroseeding. In particular, hydroseeders may also be used for, for example, application of alternate daily cover (ADC) for landfills. Moreover hydroseeders may also be used for applying mulch and water to a location without seed. Accordingly, hydroseeders as described herein are not limited to hydroseeding applications. Accordingly, it is contemplated that the material slurry may include a fewer or greater number of components (e.g., water, seed, mulch, fertilizer, or any combination thereof) without departing from the scope of the present disclosure. As will be described in greater detail herein, the hydroseeder 10 is configured to produce the material slurry to be used in the hydroseeding operation. It is noted that the term "hydroseeding operation" may refer to any use of the hydroseeder wherein a material slurry is prepared for application at a location irrespective of whether or not "seed" is a component of the material slurry. That is, the term hydroseeding is not limited to seeding applications but may be inclusive of non-seeding applications (e.g., mulching applications, fertilizing applications, and ADC applications).

Figure 2:
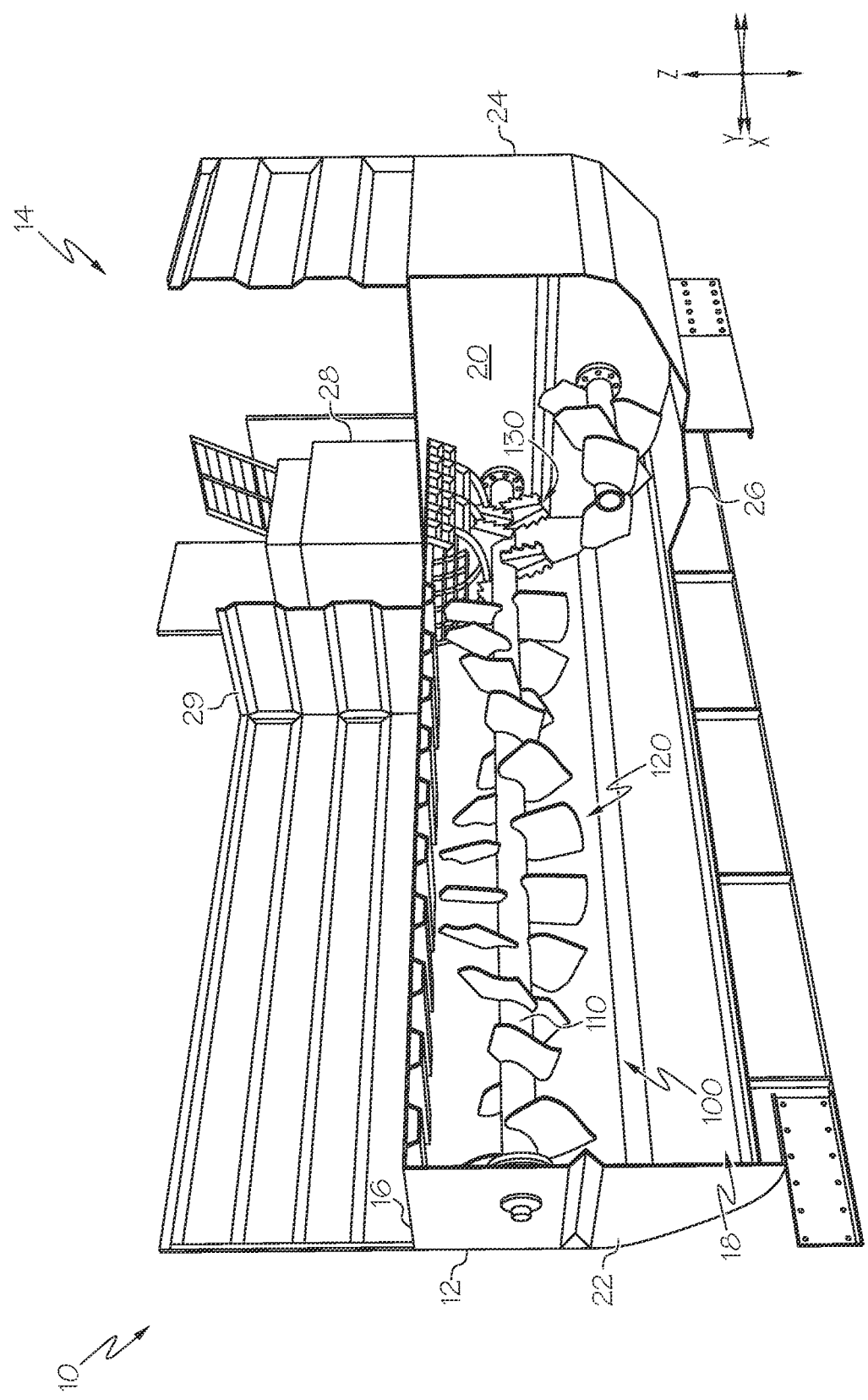
FIG. 2 depicts a sectional view of the hydroseeder of FIG. 1, according to one or more embodiments shown and described herein.

To accommodate production of the material slurry, the hydroseeder 10 includes a tank 12. In operation the tank holds the material slurry therein. Referring also to FIG. 2, a sectional view of the hydroseeder 10 illustrating an interior 18 of the tank 12 is depicted. The tank 12 may include an opening 14 that allows access to the interior 18 of the tank 12. Material bales may be passed through the opening 14 and into the interior 18 of the tank 12. The material bales may then be broken up and mixed with water (or other carrier liquid) to create the material slurry. Water may be supplied to the tank 12 through the opening 14. In some embodiments, a water inlet (now shown) may be fluidly coupled to a water source such as a lake, pond, fire hydrant, or the like to provide water to the tank 12. As will be described in greater detail herein, the material bales may be broken up with a bale grinder (e.g., grinding flights 130) incorporated in an agitator 100. As described above, material bales may include a mixture of seed, hydro-mulch, and fertilizer that has been compressed into a bale. However, as discussed above, hyrdoseeders may be used for non-seeding operations. Accordingly, it is contemplated that material bales may include a fewer or greater number of components (e.g., seed, mulch, fertilizer, or any combination thereof) without departing from the scope of the present disclosure.

In some embodiments, and as illustrated in FIGS. 1 and 2 the tank 12 may include a top wall 16 through which the opening 14 is formed and sidewalls extending from the top wall 16. The top wall 16 may define a platform. The platform may be supported by the sidewall(s) of the tank 12 and may support a weight of a user standing thereon. In the illustrated embodiment, the tank 12 includes first and second lateral sidewalls 20, 22 that are positioned opposite one another and are connected by longitudinal sidewalls 24 and a base wall 26 to enclose the interior 18 of the tank 12.

Referring to the embodiment of FIG. 2, a loading hatch 28 may be positioned over the opening 14 to provide a material chute for material bales to be passed through. The loading hatch 28 may include a lid or similar structure to allow and/or prevent access to the opening 14 of the tank 12.

In some embodiments, a railing 29 may be coupled to the top wall 16 to provide at least a partial enclosure to the platform as defined by the top wall 16. For example, the railing 29 may be coupled through any conventional coupling techniques including, but not limited to, the use of fasteners (e.g., bolts) or welding. In use, an operator may stand on the platform and using a spraying system (e.g., a sprayer and a material pump, not shown) fluidly coupled to the interior 18 of the tank 12 to discharge the material slurry within the tank 12 to a desired planting location. While hydroseeders are generally described in relation to the figures, it is noted that hydroseeders may have various shapes and constructions without departing from the scope of the present disclosure.

Referring again to FIG. 2, positioned within the tank 12 of the hydroseeder 10 is an agitator 100. The agitator 100 is positioned below the opening 14 of the tank 12 and is positioned to agitate the material slurry within the tank 12. The agitator 100 may include a rotatable shaft 110 that extends between the first lateral sidewall 20 and the second lateral sidewall 22 of the tank 12. The agitator 100 may be rotatively coupled to the first and second lateral sidewalls 20, 22 at either end of the rotatable shaft 110. Accordingly, the agitator 100 may rotate about an axis defined by the rotatable shaft 110 within the tank 12.

Figure 3:
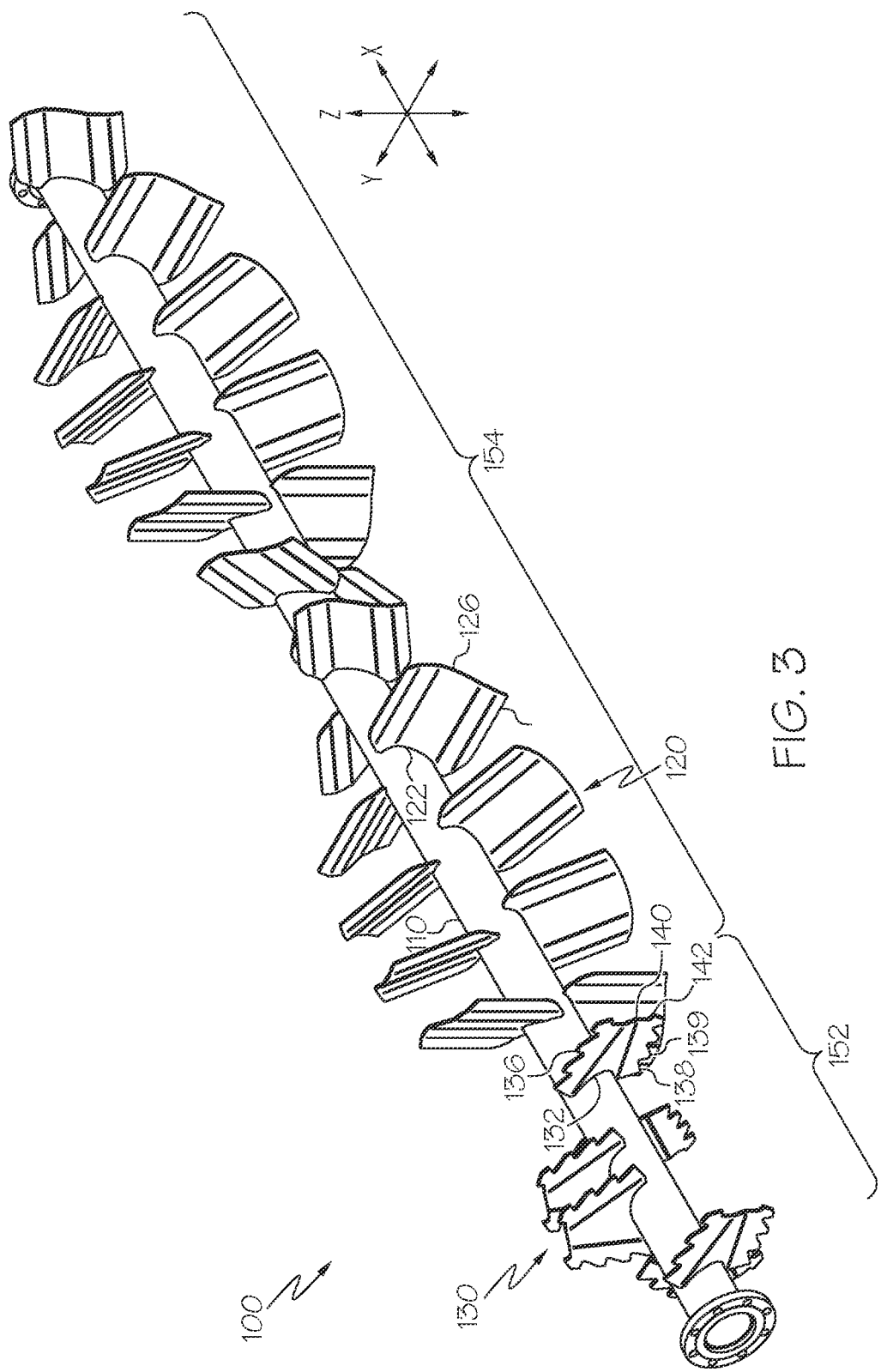
FIG. 3 depicts an perspective view of an agitator, according to one or more embodiments shown and described herein.
Figure 4A:
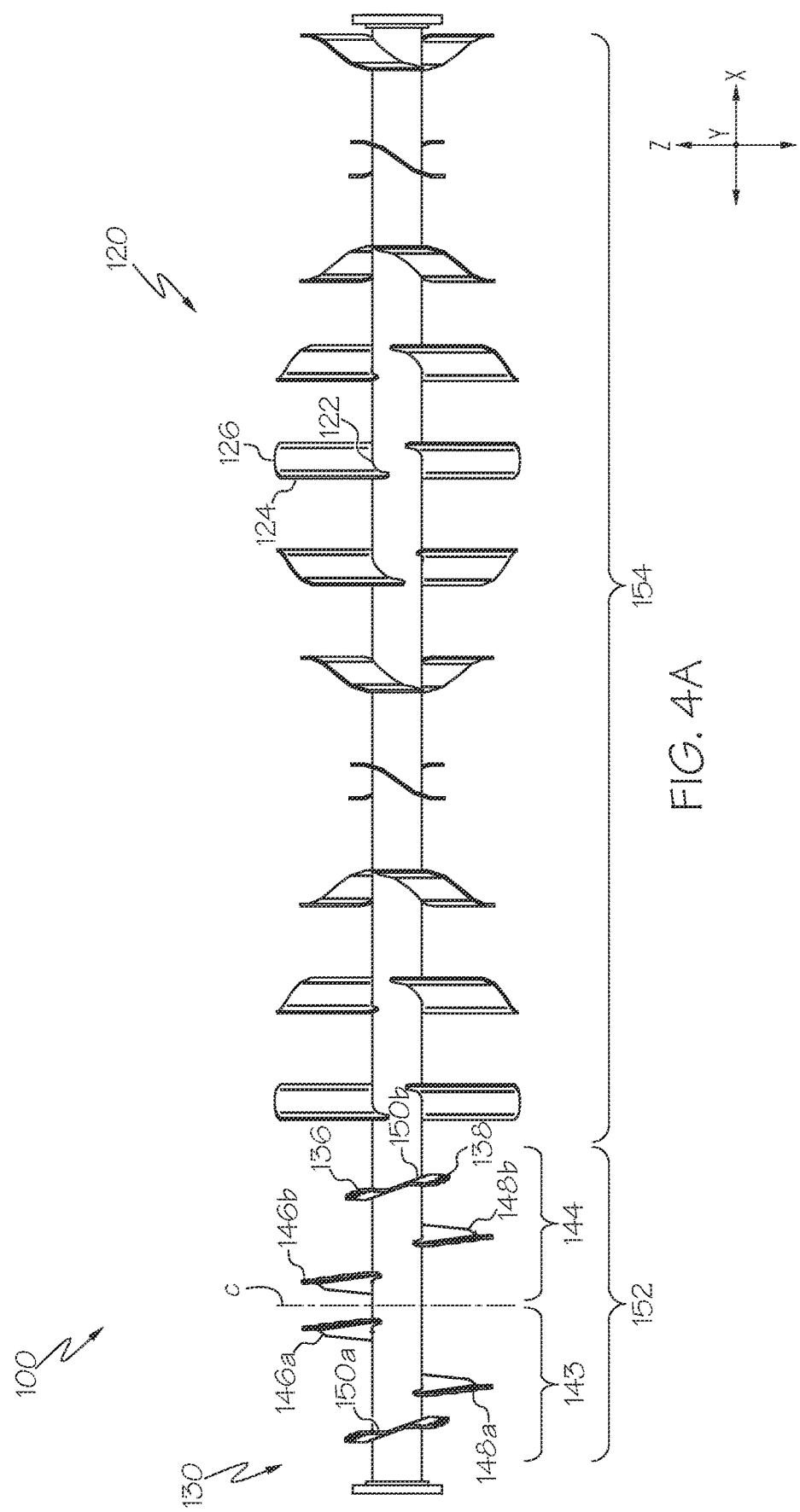
FIG. 4A depicts a side view of the agitator of FIG. 3, according to one or more embodiments shown and described herein.

FIG. 3 illustrates an perspective view of the agitator 100 in isolation from the rest of the hydroseeder 10 illustrated in FIGS. 1 and 2. Extending from the rotatable shaft 110 of the agitator 100 may be a plurality of mixing paddles 120. The plurality of mixing paddles 120 may be arranged in pairs wherein the mixing paddles 120 of each pair are positioned opposite one another across a diameter of the rotatable shaft 110. Each paddle may include a paddle base 122 coupled to the rotatable shaft 110 and a paddle body 124 extending from the paddle base 122 to a free end 126 of the paddle. The paddle body 124 may have a maximum width, as illustrated in FIG. 4A that is greater than a diameter of rotatable shaft 110. Each paddle of a pair of paddles may be angled with respect to the other paddle of the pair of paddles. For example, each paddle of each pair may be angled at a non-zero angle with respect to the other paddle. In some embodiments, the pairs of mixing paddles 120 may be helically arranged along a length rotatable shaft 110. That is each pair of mixing paddles 120 may be angled at some non-zero angle with respect to the subsequent mixing paddle pair such the mixing paddles 120 appear to wind around the rotatable shaft 110 in a corkscrew-like manner. For example, a second mixing paddle pair may be angled from a first mixing paddle pair about 30% about an axis defined by the rotatable shaft 110, and a third mixing paddle pair may be angled from the second mixing paddle pair about 30% about the axis defined by the rotatable shaft 110 and so on and so forth. In embodiments, a greater or lesser angle may be used without departing from the scope of the present disclosure. As illustrated, the plurality of mixing paddles 120 may extend along a first segment 154 of the rotatable shaft 110.

As noted hereinabove, a bale grinder may be incorporated into the agitator 100. Referring to FIG. 3, the bale grinder may comprise a plurality of grinding flights 130 may extend from the agitator 100 disposed proximate at least on edge of the rotatable shaft 110. For example, the plurality of grinding flights 130 may extend along a second segment 152 of the rotatable shaft 110. That is, illustrated in FIGS. 3 and 4A, the plurality of mixing paddles 120 may extend along the first segment 154 and the plurality of grinding flights 130 may extend along a second segment 152 that is separate from the first segment 154. Accordingly, the plurality of mixing paddles 120 are separate from the plurality of grinding flights 130. The plurality of grinding flights 130 are positioned to grind a material bale as it is introduced into the tank 12 of the hydroseeder 10. To this end and with reference to FIG. 2, the plurality of grinding flights 130 may be positioned directly beneath the opening 14 of the tank 12 to receive the material bale as it is passed through the opening 14.

Referring again to FIGS. 3-4B, each grinding flight of the plurality of grinding flights 130 may include a base 132 coupled to the rotatable shaft 110 and a body 134 extending from the base 132. The body 134 may define a first edge 136, a second edge 138, and a distal end 140. The first and second edges 136, 138 of the body 134 may be serrated edges. The distal end 140 of the grinding flight may define a notch 142. The notch 142 and serrated edges may grab onto material bales to help perform the grinding operation. In some embodiments, the first edge 136 and the second edge 138 may be staggered from one another along the axis defined by the rotatable shaft 110 (e.g., the X-axis of the depicted coordinate axes) such that the first edge 136 and the second edge 138 do not share a common plane. The body 134 of the grinding flight may be angled between the first edge 136 and the second edge 138, as illustrated in FIG. 4A.

Still referring to FIG. 4A, the grinding flights of the plurality of grinding flights 130 may be linearly staggered from one another along a length of the rotatable shaft 110. In some embodiments, the plurality of grinding flights 130 may be arranged in a first grouping 143 and a second grouping 144. The first grouping 143 and the second grouping 144 may mirror a position of the respective grinding flights 130 of each grouping about a centerline, c. For example, each grouping may include a first grinding flight 146a, 146b, a second grinding flight 148A, 148B, and a third grinding flight 150a, 150b. The first grinding flights 146a, 146b may be positioned next to one another without any intervening grinding flights positioned there between. The second grinding flights 148A, 148B may positioned to an outside of the first grinding flights 146a, 146b, followed by the third grinding flights 150a, 150b. Each of the grinding flights 130 may be coupled to the rotatable shaft 110 at consistent orientations relative to one another. That is, each grinding flight may be coupled to the rotatable shaft 110 such that the first edge 136 leads the second edge 138 in the X direction of the depicted coordinate axes. Such orientation of the two groupings 143, 144 may aid in directing material bales and portions thereof toward centerline, c. This may improve grinding efficiency and effectiveness.

Figure 4B:
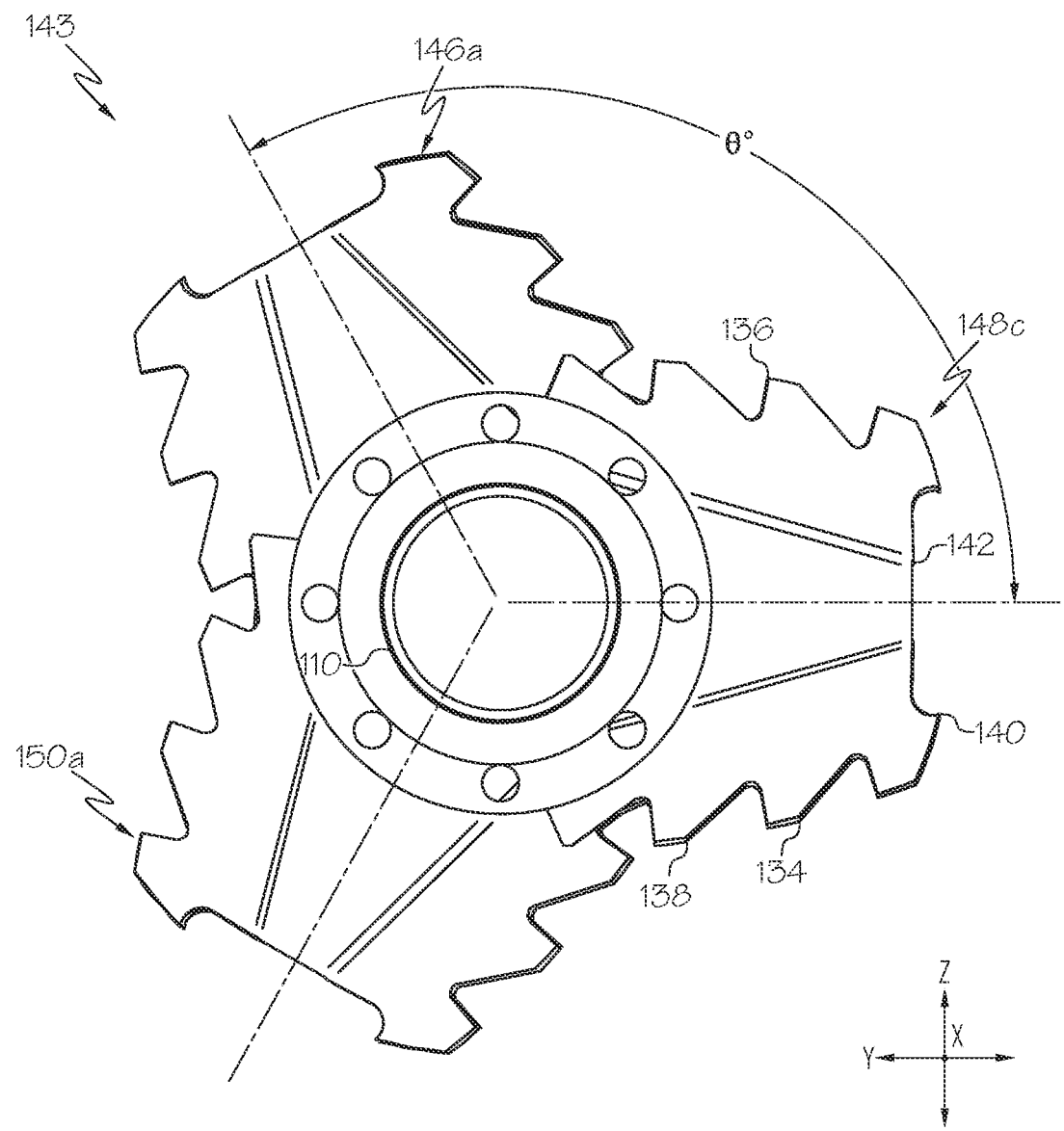
FIG. 4B depicts a front view of the agitator of FIG. 4A, according to one or more embodiments shown and described herein.

FIG. 4B illustrates a front view of the first grouping 143 coupled to the rotatable shaft 110 of the agitator 100. In the illustrated embodiment, a centerline of each of the grinding flights (146a, 146b, and 146c) is positioned circumferentially around the rotatable shaft. That is the centerline of each grinding flight is angled from the subsequent grinding flight in the Y-Z plane an angle θ. The angle between each subsequent grinding flight may be equal to the previous angle. That is the angle between the centerline of the first grinding flight 146a and the second grinding flight 148A may be equal to the angle between the centerline of the second grinding flight 148A and the centerline of the third grinding flight 150a, and so one and so forth. In the given example, wherein there are three grinding flights in the first grouping 143, the centerlines of each subsequent grinding flight may be angled about 120° from one another. In embodiments wherein a greater number of grinding flights are utilized in a grouping, the angle between grinding flights may be smaller. It is contemplated, however, that various uniform and non-uniform angles between grinding flights are contemplated and possible without departing from the scope of the present disclosure.

Figure 5A:
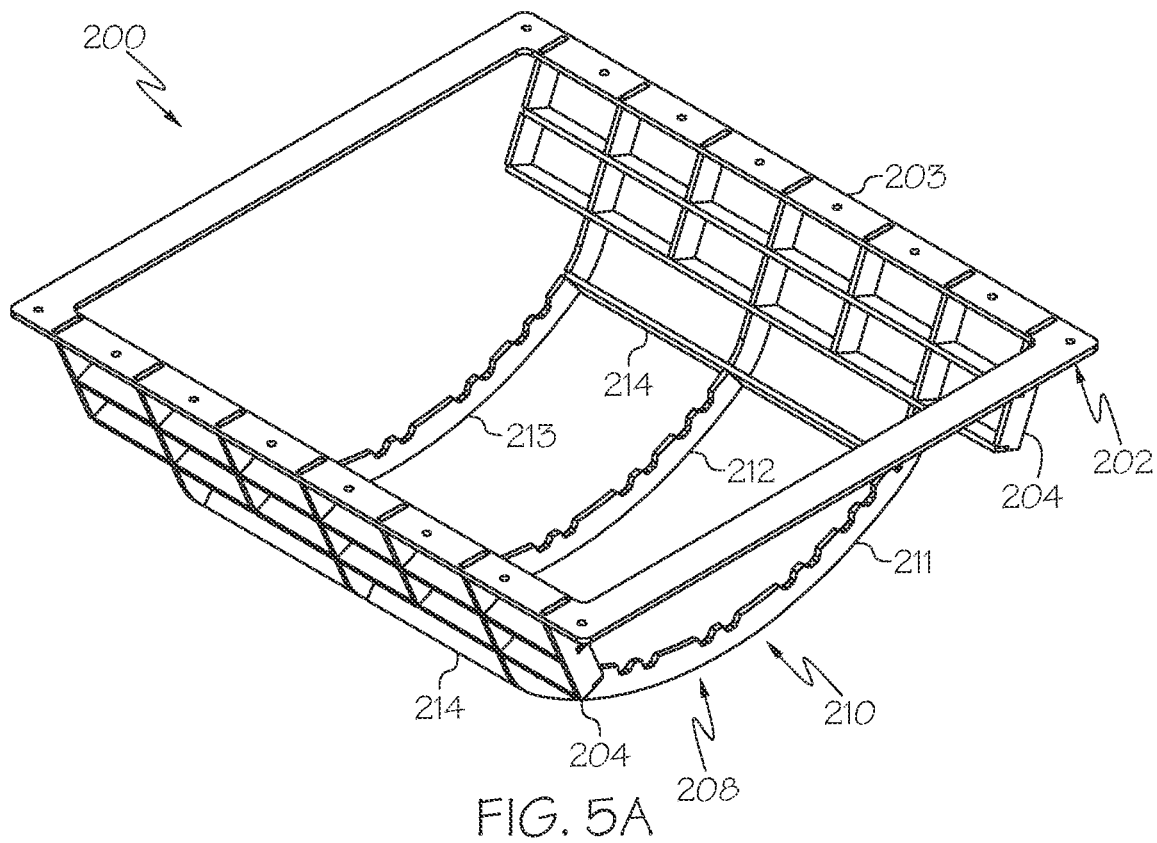
FIG. 5A depicts a perspective view of a basket, according to one or more embodiments shown and described herein.
Figure 5B:
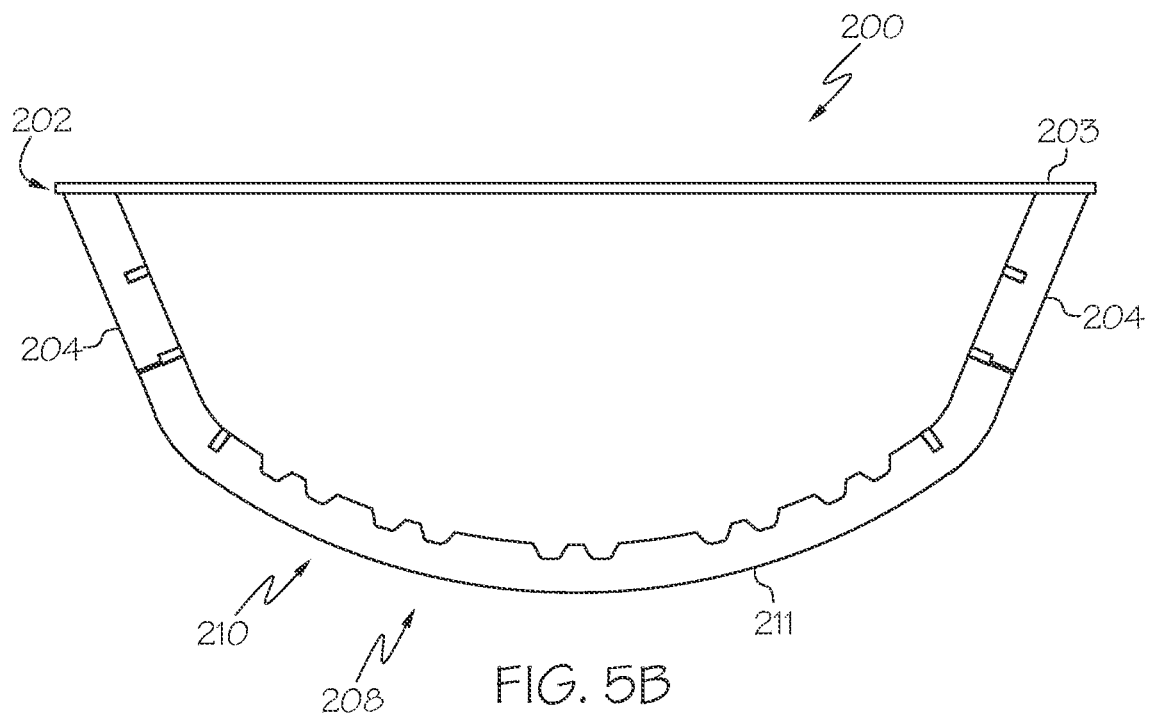
FIG. 5B depicts a side view of the basket of FIG. 5A, according to one or more embodiments shown and described herein.

Referring again to FIG. 2, the hydroseeder 10 may include a basket 200 that extends from the opening 14 of the tank 12 and directs a material bale toward the plurality of grinding flights 130. Referring also to FIGS. 5A and 5B, a perspective view and a side view of the basket in isolation from the hydroseeder 10 of FIG. 2 are respectively illustrated. The basket 200 includes a frame 202. The frame 202 may include an attachment portion 203 for coupling the basket 200 to a surface of the top wall 16 of the tank 12 around the opening 14. The basket 200 may be coupled to the tank 12 through a variety of means including, but not limited to fasteners, welding, and the like. In some embodiments, the basket 200 may be removable from the tank 12 so as to provide access to the interior 18 of the tank 12, such as when maintenance needs to be performed inside of the tank 12.

The frame 202 of the basket 200 may include sloped sidewalls 204 positioned opposite one another. The sloped sidewalls 204 may aid in directing material bales toward the grinding flights 130. The sloped sidewalls 204 may be oriented parallel to the rotatable shaft 110 of the agitator 100. In some embodiments, and as illustrated in FIGS. 5A and 5B, the sloped sidewalls 204 may be have open-celled construction, such that openings extend through the sloped sidewalls 204. In other embodiments, the sloped sidewalls 204 may be of a solid construction without openings extending therethrough.

Figure 8A:
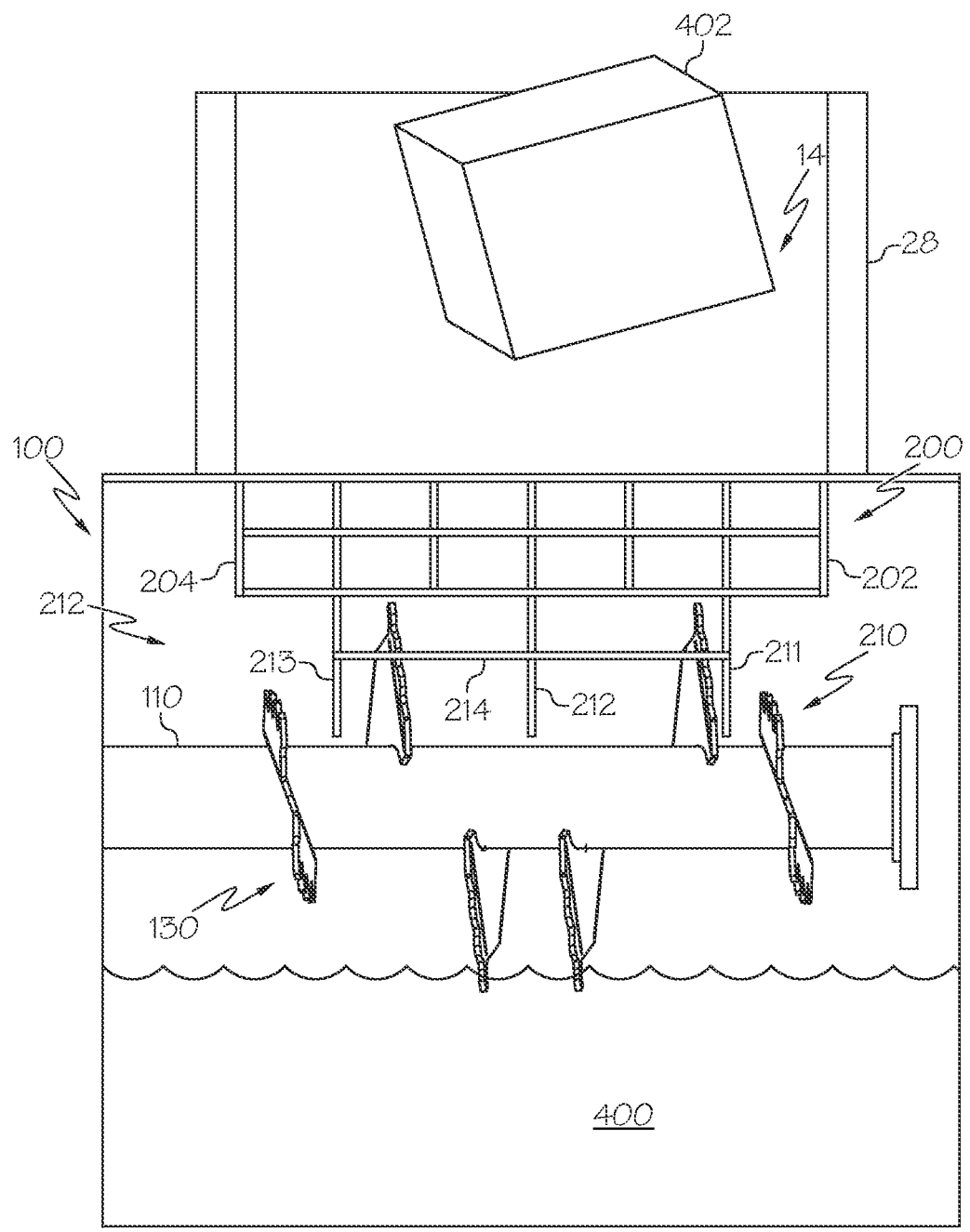
FIG. 8A schematically illustrates a material bale being placed in an opening of a hydroseeder, according to one or more embodiments shown and described herein.
Figure 8B:
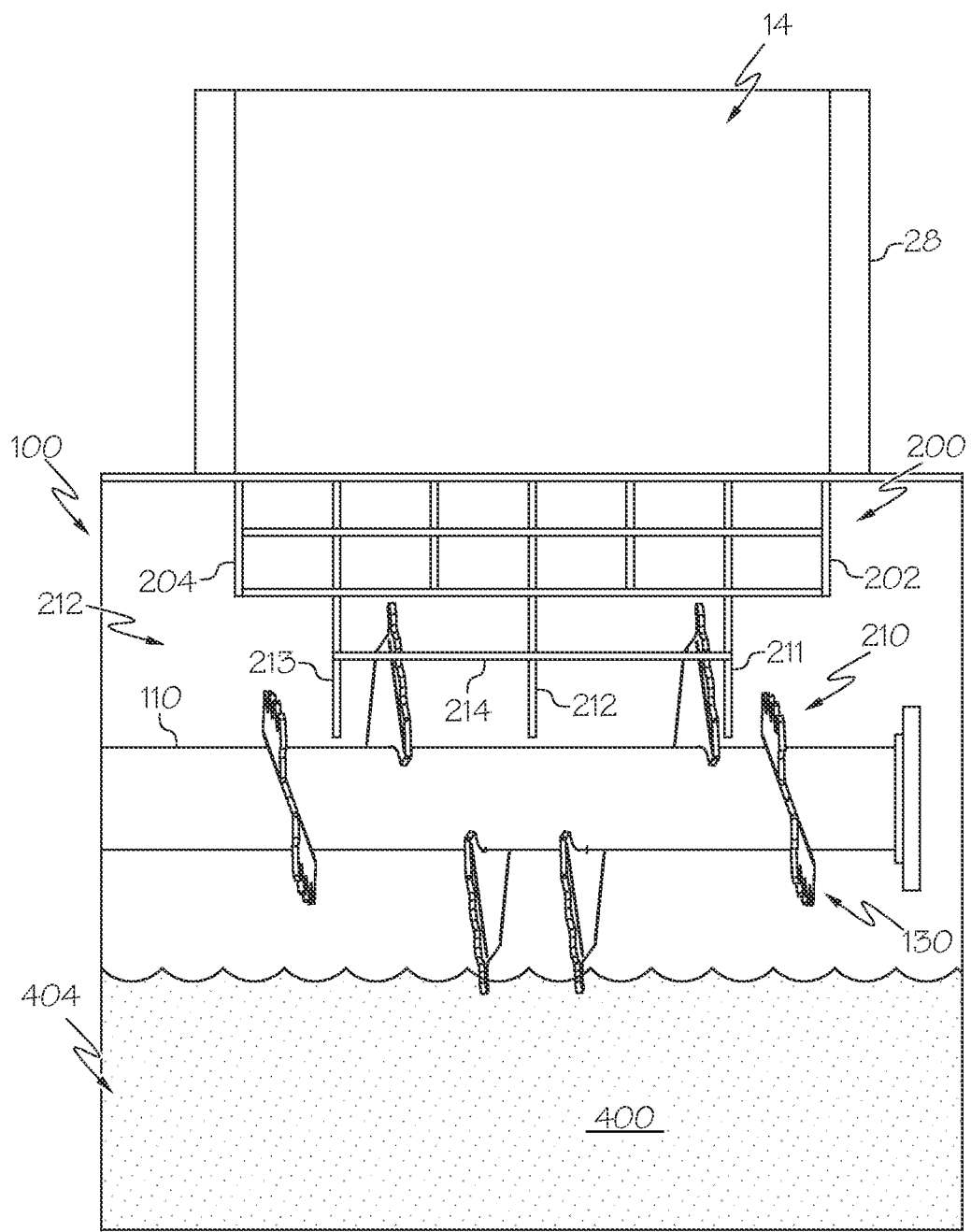
FIG. 8B schematically illustrates the ground particulate of the material bale of FIG. 8A having passed through an integrated bale grinder of the hydroseeder, according to one or more embodiments shown and described herein.

Referring briefly to FIGS. 8A and 8B, the frame 202 of the basket 200 may define flight paths 212 that allow the plurality of grinding flights 130 to rotate through a portion of the basket 200. For example, with reference again to FIGS. 5A and 5B, extending from the sloped sidewalls 204 may be a plurality of rungs 210 that define a base 208 of the basket 200. The plurality of rungs 210 may be coupled to both sloped sidewalls 204 and extend therebetween. The plurality of rungs 210 may be curved to continue to guide material bales into the base 132 of the basket 200 for grinding by the grinding flights 130 as illustrated in FIGS. 8A and 8B. In the present embodiments, three parallel rungs 211, 212, and 213 are depicted spaced apart from one another. However, it is contemplated that any number of rungs 210 may be used. The spaces around the rungs 211, 212, and 213 may define the flight paths 212 for the grinding flights 130 to rotate through. In some embodiments, the plurality of rungs 210 may have serrated edges that contact the material bales so as the encourage contact between the material bales and the plurality of grinding flights 130. That is, the serrations of the plurality of rungs 210 may grab onto the material bale 204 to better hold the material bale 402 for the grinding operation of the grinding flights 130.

One or more cross bars 214 may extend between and connect the plurality of rungs 210. The one or more cross bars 214 may provide additional support to the structure. In some embodiments, the one or more cross bars 214 may also include serrated edges to aid in guiding and holding material bales in contact with the plurality of grinding flights 130. As the plurality of grinding flights 130 grind up material bales, the basket 200 may prevent particles of the material bale from being added to the material slurry that are greater than a predetermined size. Accordingly the frame 202 of the basket 100 may exclude particles of a material bale above a predetermined size from entering the material slurry. For example, particles of material bale which may clog a material pump or sprayer unit. In some embodiments, particles of material bale which are greater than a distance between adjacent rungs (e.g., 211 and 212) may be excluded from entering the material slurry.

Figure 6:
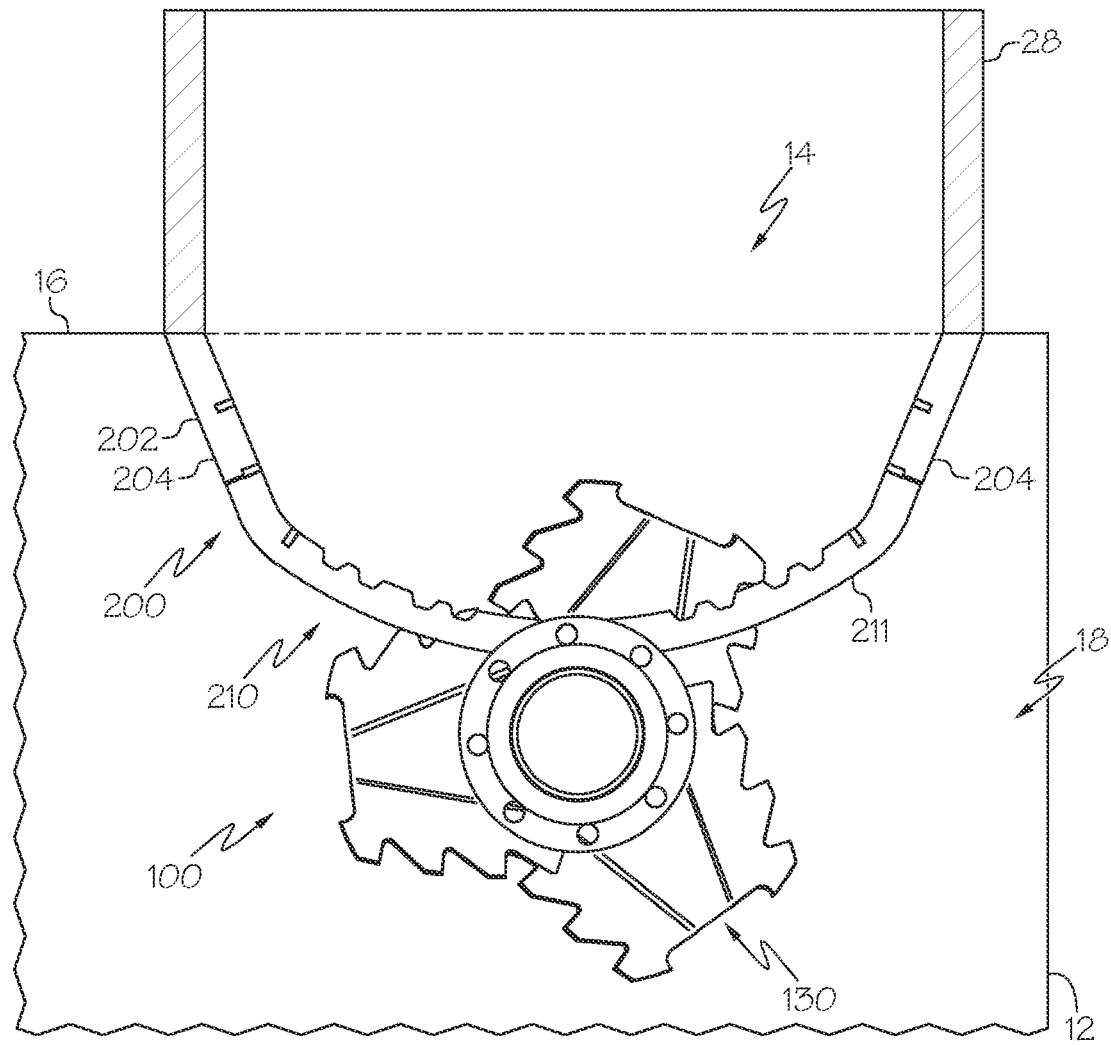
FIG. 6 schematically illustrates an interior view of a hydroseeder, according to one or more embodiments shown and described herein.

Referring to FIG. 6, the interior 18 of the hydroseeder 10 is schematically depicted. As illustrated, the basket 200 is coupled to the tank 12 around the opening 14. The agitator 100 is positioned directly below the basket 200 such that at least some of the grinding flights 130 are positioned to pass through the basket 200 (e.g., through the flight paths defined by the basket 200) when performing a grinding operation.

Figure 7:
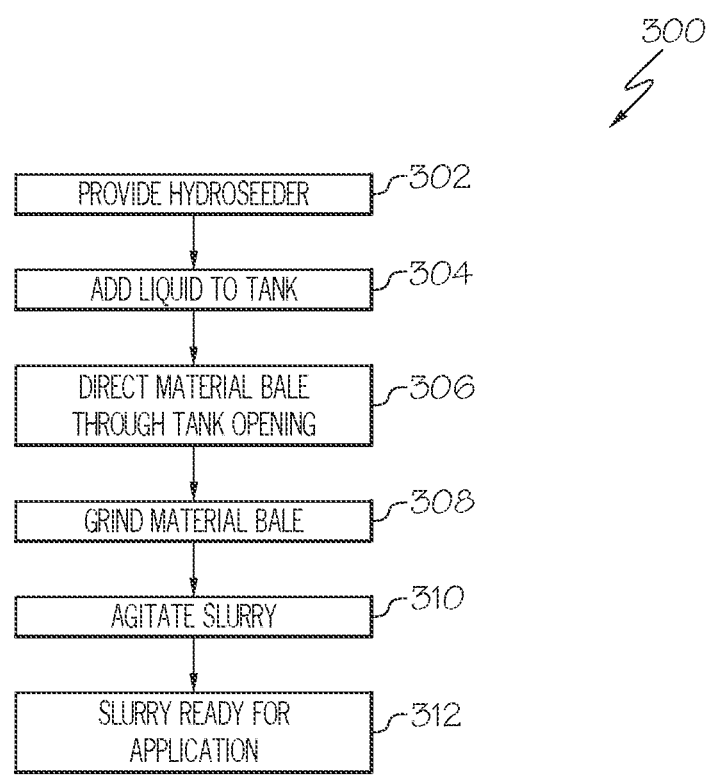
FIG. 7 illustrates a flowchart depicting a method of preparing a material slurry for a hydroseeding operation, according to one or more embodiments shown and described herein.

FIG. 7 illustrates a flow chart 300 illustrating a method of preparing a material slurry for a hydroseeding operation. FIG. 7 is best understood when described in conjunction with FIGS. 8A and 8B, which schematically illustrate a grinding operation by the plurality of grinding flights 130 of the agitator 100.

At step 302 a hydroseeder 100, such as that described in conjunction with FIGS. 1-6 is provided. A liquid 400, illustrated in FIGS. 8A and 8B is added to the tank 12 at step 304. The liquid 400 for example may include water or other suitable liquid for performing a hydroseeding operation. At step 306 a material bale 402 is directed through the opening 14 of the tank 12. The basket 200 guides the material bale 402 into contact with the grinding flights 130. As the material bale 402 is guided by the basket 200 toward the grinding flights 130 of the agitator 100 the grinding flights 130 may grind the material bale 402 into a particulate (step 308), shown in FIG. 8B. The mixing paddles 120 (shown in FIG. 2) rotate with the grinding flights 130, since they are connected to the same rotatable shaft 110, to agitate and mix the ground particulate 404 of the material bale 402 to provide the material slurry of liquid, seed, mulch, and fertilizer, for example (step 310). Once mixed, the material slurry may be ready for a hydroseeding operation (step 312). That is the material slurry may be pumped out of the tank 12 using a material pump, and sprayed onto prepared earth to seed the prepared earth.

Accordingly, aspects of the present disclosure are directed to hydroseeders that include an integrated bale grinder. In particular, the bale grinder is incorporated into an agitator of the hydroseeder and is configured to grind up material bales as they are introduced into a tank of the hydroseeder. In the embodiments described herein, grinding flights are coupled to an agitator of the hydroseeder and positioned beneath an opening in the hydroseeder, which allows the grinding flights to grind material bales as they are dropped into the opening of the hydroseeder. This allows for the material bales to be more finely broken apart and integrated into the material slurry, which may prevent clogs in the sprayer/pump of the hydroseeder. Accordingly, a more efficient hydroseeder may be provided.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hydroseeder having an integrated bale grinder comprising:
   a tank comprising an opening and configured to hold a material slurry; and
   an agitator positioned below the opening and configured to agitate the material slurry, the agitator comprising:
      a rotatable shaft;
      a plurality of mixing paddles extending from the rotatable shaft along a first segment;
      a plurality of grinding flights extending from the rotatable shaft along a second segment and configured to grind a material bale to be introduced into the tank; and
      a basket extending from the opening of the tank and configured to direct the material bale from the opening toward the plurality of grinding flights, wherein the basket defines flight paths that allow the plurality of grinding flights to rotate through a portion of the basket when the rotatable shaft rotates.

2. The hydroseeder of claim 1, wherein:
   the tank comprises a first lateral sidewall and a second lateral sidewall; and
   the rotatable shaft extends between the first lateral sidewall the second lateral sidewall of the tank.

3. The hydro seeder of claim 2, wherein the grinding flights of the plurality of grinding flight are linearly staggered from one another along a length of the rotatable shaft of the agitator.

4. The hydroseeder of claim 1, wherein the basket comprises a frame which excludes particles of the material bale from being added to the material slurry that are greater than a predetermined size.

5. The hydroseeder of claim 1, wherein:
   the tank comprises a top wall, wherein the opening is formed within the top wall, and first and second lateral sidewalls extending from the top wall; and
   the basket extends from the opening into the tank between the first and second lateral sidewalls.

6. The hydroseeder of claim 1, wherein the plurality of grinding flights comprise serrated edges.

* * * * *